United States Patent [19]

Hyde

[11] 4,346,183

[45] Aug. 24, 1982

[54] METHACRYLATE POLYMER MIX CONTAINING ALKALINE EARTH METAL RESINATE

[75] Inventor: Thomas J. Hyde, Wilmington, Del.

[73] Assignee: E. I. Du Pont de Nemours and Company, Wilmington, Del.

[21] Appl. No.: 288,006

[22] Filed: Jul. 29, 1981

Related U.S. Application Data

[63] Continuation-in-part of Ser. No. 136,912, Apr. 3, 1980, abandoned.

[30] Foreign Application Priority Data

Apr. 3, 1981 [JP] Japan ................................. 56-49487

[51] Int. Cl.³ ............................................. C08L 93/00

[52] U.S. Cl. ..................................... 523/200; 524/77; 524/764; 524/906

[58] Field of Search ....... 260/42.53, 30.6 R, 33.6 UA, 260/27 R

[56] References Cited

FOREIGN PATENT DOCUMENTS 2818954 11/1978 Fed. Rep. of Germany ... 260/42.52
52-72786 6/1977 Japan ................................. 260/42.52
983826 2/1965 United Kingdom .

*Primary Examiner*—Lewis T. Jacobs

[57] ABSTRACT

The addition of an alkaline earth metal resinate to methacrylate polymer concrete mix can produce a wet concrete with good workability.

5 Claims, No Drawings

METHACRYLATE POLYMER MIX CONTAINING ALKALINE EARTH METAL RESINATE

CROSS-REFERENCE TO RELATED APPLICATIONS

This application is a continuation-in-part of application Ser. No. 136,912, filed Apr. 3, 1980, now abandoned.

FIELD OF THE INVENTION

This invention relates to methacrylate polymer concrete mix and components thereof, and more particularly to such mix as is employed to repair concrete surfaces or to prepare precast concrete members.

BACKGROUND OF THE INVENTION

Methacrylate polymer concrete mix (MPC) has been employed to patch and repair concrete surfaces, such as roadways, sidewalks, runways and flooring. For example, MPC mix is described in British Pat. No. 983,826. To form a patch of cured MPC, methyl methacrylate monomer is mixed with a powder mixture and subsequently polymerized in situ after filling or covering the concrete area to be patched.

Once an initiator (usually a peroxide) and a promoter (usually an aromatic amine) have been added to the methacrylate monomer liquid polymerization takes place rapidly, in an hour or less in a typical case. For this reason it is a common practice to blend the promoter with the methacrylate monomer liquid and to blend the peroxide initiator with powder mixture, aggregate, and to combine the two blends at the repair site just prior to pouring the combined material into or onto the patch area. Alternatively, but less desirably, the powder mixture aggregate can be placed in or on the area to be repaired, and the peroxide initiator added to the liquid methacrylate monomer mixture which already contains the amine promoter, and this liquid mixture poured over the powder mixture so as to wet the particles.

The powder mixture is made of inorganic fillers such as silica or calcium carbonate of various particle sizes, colorants such as titanium dioxide and/or iron oxide, a polymerization initiator for methyl methacrylate monomer, a small amount of a plasticizer such as an organophosphate and a small amount of a methacrylate polymer. The methacrylate monomer portion (sometimes referred to hereinafter as liquid mixture) contains mostly methacrylate monomer along with a small amount of an anti-shrink agent such as a paraffinic oil and a small amount of a polymerization promoter such as N,N-dimethyl toluidine.

At the repair site, the powder mixture and the liquid mixture are combined, mixed, and poured onto the patch area. The polymerization initiator in the powder mixture initiates polymerization of the methacrylate monomer and the combined mixture, which is MPC, begins to cure through polymerization of the methacrylate. Upon completion of polymerization, the cured material is hard and concrete-like.

It is known that when the filler material of the powder mixture is of varying sizes, the spaces, or voids, between the particles is reduced. A filler, such as calcium carbonate, may also be a part of the powder mixture and aids in reducing the total void content. It is desirable to reduce the void content because, as the void content decreases, less monomer liquid is needed in the MPC. Less monomer liquid is desirable because the volume of the polymer formed is less than the volume of the corresponding monomer needed to form the polymer. Thus shrinkage occurs as the polymerization is carried out. Such shrinkage often causes cracking and delamination in the cured MPC. Thus, it is desirable to minimize the amount of monomer present.

However, as the amount of liquid is decreased, the combined powder mixture and liquid becomes stiff and difficult to work, such as by trowelling or smoothing, as it is placed and consolidated.

SUMMARY OF THE INVENTION

It has now been found that good workability can be imparted to such mixtures by employing an alkaline earth metal resinate, i.e., a salt of a resin acid or derivative thereof, in the methacrylate polymer concrete mix.

The alkaline earth metal resinate can be added separately immediately after the powder mixture and the liquid mixture are combined. Alternatively the alkaline earth metal resinate can be present in the powder mixture before the powder mixture is combined with the liquid mixture, and in this instance, it is convenient to coat the powder mixture with the resinate. In still another alternative, the resinate can be present in the liquid mixture before the liquid mixture is combined with the powder mixture.

DESCRIPTION OF THE INVENTION

I. The Powder Mixture (a) The Particulate Inorganic Fillers

The particle size distribution of the filler in the powder mixture was selected to promote efficient packing of particles and to reduce the void volume between particles. In this way the amount of methacrylate monomer and other liquids required to wet the aggregate can be reduced.

Silica and/or carbonate particulate can be used. Fillers with different size distributions can be blended to attain a mixture in close agreement with the particle size distribution specified in Method C-33 of the ASTM. Also rounded particles are preferred over particles with angular, irregular surfaces. A list of a typical blend of particles which was found to be useful is given in Example 1. The amount present in the powder mixture can range from 60 to 90% by weight.

The particles of smallest diameter, predominantly passing the No. 200 (75 $\mu$m) sieve, are of critical importance in the formulation because these particles have the greatest surface area per unit volume. Therefore, these particles have a considerable effect on the amount of methacrylate monomer required to obtain a workable slurry mix. For convenience herein, these particles will be called "inorganic fines". The inorganic fines ordinarily are selected from plentiful, low-cost materials such as amorphous silica or calcium carbonate; each with average particle size less than 75 $\mu$m. The amount of inorganic fines present in the powder mixture can range from 0.5 to 30% by weight.

(b) Colorants

Although not required, inorganic pigments are often added to obtain a light gray color or off-white color similar to that of portland cement concrete. In this way, when MPC is used to repair conventional concrete, the two materials are similar in color. A blend of titanium dioxide and black iron oxide provides the desired color.

The shading of gray color can be varied as desired by adjusting the ratio of the two pigments.

Generally, the amount of colorant, if present, in the powder mixture can range from 0.3 to 3.0% by weight.

(c) Polymerization Initiator

Ordinarily, the methacrylate initiator will be a peroxide initiator. Useful peroxide initiators include aromatic diacyl peroxides such as benzoyl peroxide and 2,4-dichlorobenzoyl peroxide. Also aliphatic diacyl peroxides, such as lauroyl peroxide, may be used provided that the ambient temperature at time of cure is 20° C. (68° F.) or warmer. Generally the initiator will be present in the powder mixture in an amount of between 0.1 and 1.0% by weight.

(d) Plasticizer

The brittleness of the methacrylate polymer in MPC can be reduced by the addition of a liquid plasticizer. These plasticizers, which are widely known, include phthalate esters, phosphate esters, and liquid polyester plasticizers. Specific examples include isooctyl benzyl phthalate, di(2-ethylhexyl) azelate, tricresyl phosphate, and butyl phthalyl butyl glycolate. The addition of plasticizer is known to depress the glass transition temperature of the polymer. The amount of plasticizer which may be added is limited by the fact that the glass transition temperature of the polymer must be above the maximum temperature encountered in a specific application and generally is no more than 3.0% by weight.

(e) Methacrylate Polymer

Methacrylate polymer (including copolymer) is added in the form of minute spherical beads or crushed cubes. The function of this material is to swell or dissolve when it comes into contact with methacrylate monomer and to seal off the surface of the MPC once it has been placed into a concrete repair area. As a result, the loss of methacrylate monomer due to its volatility is greatly reduced. Examples of useful acrylic polymers include polymethyl methacrylate, the copolymers of methyl methacrylate and ethyl acrylate, and the copolymers of methyl methacrylate and butyl methacrylate. Methacrylic acid may be used as a comonomer with any of the above combinations. The amount present in the powder mixture will generally be no more than 8.0% by weight.

II. The Liquid Mixture

The liquid mixture is composed mostly of a methacrylate monomer, e.g., 80% or more by weight of the mixture. Typical methacrylate monomers which may be used are methyl methacrylate, ethyl methacrylate, butyl methacrylate, 2-ethylhexyl methacrylate, lauryl methacrylate, and crosslinking monomers such as ethylene glycol dimethacrylate and trimethylolpropane trimethacrylate. Also methacrylic acid may be used as a comonomer. Methyl methacrylate may be used as the sole monomer, or it may be used in a blend with a second monomer, provided that the glass transition temperature of the cured MPC is above the maximum temperature encountered in a specific application. For example, in highway applications, the maximum temperature for most climates in the United States is 50° C. (120° F.). The compressive strength of the polymer concrete declines at temperatures close to the glass transition temperature of the cured MPC.

An anti-shrink agent is present and the addition of paraffinic oil has been found to act as a shrink reduction agent during the polymerization. A useful paraffinic oil has a viscosity of 12.8 centistokes at 37.8° C. (100° F.) and a specific gravity of 0.857 at 25° C. (77° F.). The addition of paraffinic oil may range from 3 to 12% of the liquid mixture.

A polymerization promoter is also present in the liquid mixture. Certain aromatic tertiary amine promoters are preferred. Useful aromatic amine promoters include N,N-dimethyl-p-toluidine (DMPT); N,N-dimethylaniline; N,N-diethylaniline; and N-phenyldiethanolamine. The concentration of aromatic amine may vary from 0.5 to 4.0% of the liquid mixture.

III. Combination of Powder Mixture and Liquid Mixture

The powder mixture and the liquid mixture are simply poured together in amounts ranging from 91–96 parts of powder mixture and 9–4 parts of liquid mixture, and are mixed by any ordinary means. A preferred method of mixing is in an ordinary cement mixer. The resulting slurry is poured onto the concrete area to be patched and is then cured. The cure is ordinarily carried out at prevailing ambient temperatures (−7° C. to 50° C.; 20° F. to 120° F.), with no external heat source applied. To attain a useful rate of cure at ambient temperatures in 8 hours or less, preferably in about one hour, the composition contains both an organic peroxide initiator and a tertiary aromatic amine which acts as a promoter.

IV. The Alkaline Earth Metal Salt of a Resin Acid

Alkaline earth metal salts of resin acids have been found to be effective in improving the workability of slurries of methacrylate polymer concrete mix under conditions as encountered in a conventional concrete mixer for a short period of time (e.g., one or two minutes). Resin acid is a term used in the chemical literature to describe a complex mixture of monocarboxylic acids, with a typical composition of $C_{20}H_{30}O_2$, derived from pine tree exudate, tree stumps, or tall oil manufacture. Major components are abietic acid and pimaric acid. Their formulas are, respectively,

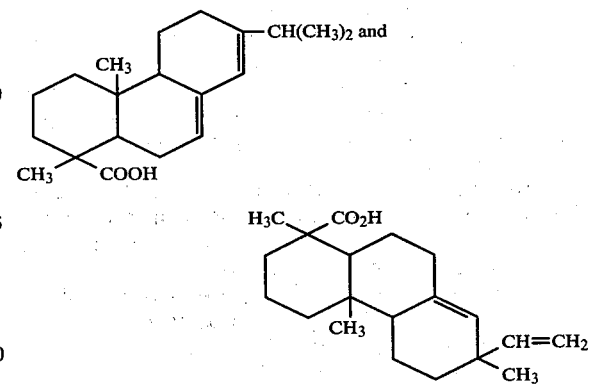

These resin acids which contain two double bonds can be modified by reaction of the double bonds to produce (a) hydrogenated resin acid or under different conditions (b) partially polymerized resin acid. The term alkaline earth resinate as used herein means the resin acids and derivatives (a) and (b). The alkaline earth metal salts are derived from atoms in Groups IIA and IIB of the atomic table. The most practical examples are calcium, magnesium, and zinc salts, and mixtures thereof. The alkali metal salts derived from atoms in Group I, such as sodium resinate, are undesirable because they are water-soluble, and provide an undesirable water-sensitive ingredient into the methacrylate polymer concrete.

The degree of neutralization by alkaline earth metal cations of resin acid and its derivatives (a) and (b) may be partial or complete, as determined by the acid number of the material. Acid number is defined as the milligrams KOH required to neutralize one gram of material. The acid number of resin acid is 165. Resin acid that approaches complete neutralization has an acid number less than 10. Partially neutralized material that is useful in this invention has an acid number equal to or less than 100.

Resin acid can only be partially neutralized by Ca(OH)$_2$, down to an acid number of about 50 when neutralized in solution. If more Ca(OH)$_2$ is added, an intractable gel is formed. When resin acid is reacted with both Ca(OH)$_2$ and ZnO in solution, it is possible to combine enough of both metals so that the acid number drops to less than 10. Ca/Zn resinate with an acid number less than 10 is a particularly preferred form of the resinate.

For best results, the alkaline earth resinate should be dissolved in the methacrylate liquid mixture in an amount of 0.5 to 9.0% by weight, or coated on the filler, especially the inorganic fines of the powder mixture. A preferred embodiment is to dissolve the alkaline earth resinate in a hydrocarbon solvent such as mineral spirits, or in methyl methacrylate monomer, at 50% to 90% solids; then to add the solution to the methacrylate liquid mixture. A second preferred embodiment is to coat about 100 parts filler, especially calcium carbonate, fines with about one part of resin acid and heat the coated material to a temperature which will promote the formation of calcium resinate on the surface of the particles. A third preferred embodiment is to coat amorphous silica fines with a solution of alkaline earth metal resinate, followed by a drying step. In the powder mixture, the resinate should be present in an amount of from 0.05 to 0.3% by weight.

In the MPC slurry, i.e., a mixture of powder mixture and liquid mixture, the useful concentration of alkaline earth resinate is from 0.03% to 0.60% by weight of slurry. The preferred concentration range is from 0.04% to 0.40%. If too little resinate is used, the workability of the polymer concrete slurry is not improved significantly. If too high a concentration of resinate is used, the strength of the methacrylate polymer concrete begins to decline.

V. Examples

Example 1

In this Example, three powder mixtures were prepared. Calcium resinate coated on calcium carbonate particulate is present in powder mixture III. Powder mixture I contains uncoated calcium carbonate particulate and powder mixture II contains calcium stearate coated on calcium carbonate particulate. Thus, this Example compares powder mixture III, which is within the scope of the invention described herein, with powder mixtures I and II, which are not within the scope of the invention.

Powder mixture I was prepared by mixing the following:

| Ingredient | Major Fraction U.S. Standard Sieve Size | | % by Weight |
|---|---|---|---|
| | Pass | On | |
| Sandblast Sand A | No. 8 | No. 16 | 23.87 |
| Sandblast Sand B | No. 30 | No. 100 | 18.13 |
| Silica Sand A | No. 30 | No. 50 | 25.58 |
| Silica Sand B | No. 50 | No. 100 | 8.11 |
| Silica Sand C | No. 50 | No. 200 | 2.48 |
| Silica Sand D | No. 100 | No. 200 | 2.48 |
| Calcium Carbonate- with no surface treatment | No. 200 | | 11.94 |
| Titanium Dioxide | No. 325 | | 0.62 |
| Iron Oxide | No. 325 | | 0.06 |
| Benzoyl Peroxide/ CaHPO$_4$.2H$_2$O (35/65 by weight) | No. 325 | | 0.90 |
| Methacrylate Copolymer A | No. 20 | No. 200 | 3.95 |
| Isodecyl Diphenyl Phosphate | Liquid | | 1.88 |

Methacrylate Copolymer A is a copolymer of methyl methacrylate and ethyl acrylate (95/5 by weight) with an inherent viscosity of 0.52. The inherent viscosity is measured on a solution containing 0.25 g. polymer in 50 ml. methylene chloride, measured at 20° C. using a Cannon-Fenske viscometer.

Powder mixture II was prepared the same as I, except that the calcium carbonate with no surface treatment was replaced with an equal weight of calcium carbonate powder which was coated with approximately one percent of calcium stearate. The average particle size was less than 75 $\mu$m in each case.

Powder mixture III was prepared the same as I, except that the calcium carbonate with no surface treatment was replaced with an equal weight of calcium carbonate powder which was coated with approximately one percent of calcium resinate. The resinate was derived from a resin acid in which the predominant acid is abietic acid, $C_{20}H_{30}O_2$. Once again, the average particle size was less than 75 $\mu$m. The acid number of the calcium resinate could not be determined in this case because a solution of the resin acid was coated on the calcium carbonate particles, and then the particles were heated to promote formation of calcium resinate which was firmly bonded to the surface of the particles.

Liquid mixture I was prepared by mixing:

| Ingredient | % by Weight |
|---|---|
| Methyl Methacrylate | 92.8 |
| Paraffinic Oil A | 6.4 |
| Dimethyl p-Toluidine | 0.8 |

Paraffinic Oil A has a viscosity of 12.8 centistokes at 37.8° C. (100° F.) and a specific gravity of 0.857 at 25° C. (77° F.).

In separate tests, 8.0 parts of liquid mixture I were mixed with 92.0 parts of powder mixtures I, II and III. The components were mixed in a standard concrete mixer for two minutes, to simulate mixing under roadside conditions. Then the fluidity of the slurry was measured by a standard method of test for slump of concrete (ASTM C-143). In this test, a specified cone-shaped mold is filled to a height of 12 inches. Then the mold is removed, and the slump of the material below the original 12 inches is reported. The following results were observed.

| Liquid Mixture | Powder Mixture | Slump (Inches) | (cm) | Handling Characteristics |
|---|---|---|---|---|
| I | I | 1/4 | 0.6 | Very Stiff |
| I | II | 5/8 | 1.6 | Very Stiff |
| I | III | 7 1/4 | 18.4 | Very Fluid |

Then each of the slurries was charged to a set of cylindrical molds and allowed to cure at an ambient temperature of 20° C. (68° F.). These cylinders were subjected to the standard method of test for compressive strength of cylindrical concrete specimens (ASTM C-39) and for chord modulus of elasticity in compression (ASTM C-469).

| Sample Which Contains Powder Mixture Noted Below | Compressive Strength (psi) | (MPa) | Modulus of Elasticity (psi) | (kPa) |
|---|---|---|---|---|
| Mixture I | 8,452 | 58.2 | $2.77 \times 10^6$ | $19.1 \times 10^6$ |
| Mixture II | 6,246 | 43.0 | $1.52 \times 10^6$ | $10.5 \times 10^6$ |
| Mixture III | 7,840 | 54.0 | $3.00 \times 10^6$ | $20.7 \times 10^6$ |

The compressive strength and modulus of cylinders derived from powder mixture III were similar to the strength and modulus of cylinders derived from powder mixture I. However, the properties derived from powder mixture II were inferior to those derived from powder mixture I.

The presence of calcium stearate did not improve the workability of the methacrylate polymer concrete (MPC) slurry, and the stearate had a deleterious effect on physical properties which would be objectionable in practice. The presence of calcium resinate improved the workability of the MPC slurry and retained the physical properties of the cured MPC.

Example 2

Powder mixture III (which contained $CaCO_3$ coated with calcium resinate) and liquid mixture I of Example 1 were used to apply an overlay repair, 1.40 inch thick (3.5 cm.), on top of a worn concrete surface. First the worn surface was coated with a clear methacrylate primer, applied with a paint brush. The primer consisted of the following:

| Ingredient | % By Weight |
|---|---|
| Methyl Methacrylate | 85.7 |
| Methacrylate Copolymer B | 12.0 |
| 1,3-Butylene Glycol Dimethacrylate | 1.0 |
| N,N-Dimethyl-p-Toluidine | 0.3 |
| gamma-Methacryloxypropyltrimethoxysilane | 1.0 |

Methacrylate copolymer B is a copolymer of methyl methacrylate and ethyl acrylate (95/5 by weight) with an inherent viscosity of 0.44. At the time of use, the cure of the primer was initiated by dissolving 1.6 parts of a mixture of benzoyl peroxide and dicyclohexyl phthalate (50/50 by weight) in one hundred parts of primer, at an ambient temperature of 80° F. (27° C.). Once the initiator has been added, the working pot life for the primer is about 30 minutes before the primer cures. For best results, the amount of benzoyl peroxide should be adjusted to compensate for changes in the ambient temperature.

The primer was allowed to dry for 5 minutes. Then liquid mixture I and powder mixture III were charged to a conventional concrete mixer at a ratio of 8.0 to 92.0, and mixed for two minutes. The slurry was discharged into the area to be covered (15 ft.×2.0 ft.×1.4 inch thick, or 457 cm.×61 cm.×3.5 cm.) which was framed by a wooden form. The slurry was placed by conventional tools (shovel, screed, and trowel) to yield a level overlay. The uniformity, workability, and consistency of the material were found to be good when handled with conventional tools. Workability refers to the ease with which concrete is placed and consolidated. Consistency refers to the wetness of the mix, as measured by Method C-143 of the ASTM. Several batches in the mixer were required to fill the entire area. The surface was wiped lightly with a broom to give a skid-resistant texture. The methacrylate polymer concrete cured to a hard mass in less than two hours. When the concrete was inspected the next day, the adhesion to the old concrete was excellent, and there were no cracks caused by shrinkage.

Example 3

This Example illustrates that coarse sand can be used as an extender in the methacrylate polymer concrete in an overlay 0.5 inch thick (1.3 cm.). First the worn substrate was primed as in Example 2. Then the ingredients were charged to a concrete mixer in the following order, which was found to promote good mixing:

|  | Parts |
|---|---|
| No. 3 Sandblast Sand | 13.5 |
| Liquid Mixture I | 8.0 |
| Powder Mixture III | 65.0 |
| No. 3 Sandblast Sand | 13.5 |

No. 3 sandblast sand is defined as that fraction which passes through a No. 4 (4.75 mm.) sieve and is predominantly retained on a No. 16 (1.20 mm.) sieve. The slurry was mixed and placed in an area which measured 15 ft.×12 ft.×0.5 inches thick (457 cm.×366 cm.×1.3 cm.). The material was finished and cured as in Example 2. The workability of the material was good. A screed which was 14 feet long (426 cm.) was used to level the material quite readily. Also the overlay was placed on a slope (three degrees) to judge whether or not sag was a problem. The wet mixture showed no tendency to sag on the slope.

When the polymer concrete was examined the next day, the adhesion was found to be excellent, and there were no cracks caused by shrinkage. The texture of the surface was rougher than that of Example 2, due to the presence of coarse sand. The coarse texture promotes high skid resistance on highway surfaces.

Example 4

This Example illustrates that coarse gravel (with 0.38 inch average diameter; 0.96 cm.) can be used as an extender in the methacrylate polymer concrete in patching a pothole on a concrete highway. A pothole which measured 8 ft.×1.5 ft.×2.5 inches (244 cm.×45 cm.×6.4 cm.) was coated with the primer described in Example 2. Then the ingredients were charged to a concrete mixer in the following order:

|  | Parts |
|---|---|
| Gravel (0.38 inch average diameter; 0.96 cm.) | 23.1 |
| Liquid Mixture I | 5.9 |
| Powder Mixture III | 47.9 |
| Gravel (as described above) | 23.1 |

The slurry was mixed for two minutes, placed in the hole, vibrated to insure good compaction, and finished by use of screed and trowel. The uniformity, workability, and consistency of the polymer concrete were found to be good. The temperature of the concrete was recorded, and a maximum exotherm of 122° F. (50° C.) was reached within an hour after mixing. When the concrete was examined the next day, the adhesion was excellent, and there were no cracks caused by shinkage. The compressive strength of this composition was 8,200 psi (56.5 MPa), and the modulus of elasticity was $4.4 \times 10^6$ psi ($30.3 \times 10^6$ kPa).

Example 5

Example 5 illustrates the addition of calcium resinate of the dose used in Example 1 in order to improve the workability of methacrylate polymer concrete mix which contained untreated $CaCO_3$ fines (less than 200 mesh; 75 μm.). Calcium Resinate A, used in this example, had an acid number of 90. Powder mixture I of Example 1 (which contained untreated $CaCO_3$) and liquid mixture I from Example 1, which contains the additive listed in the table below, at a ratio of 92.0 parts to 8.0 parts, were mixed in a concrete mixer for 2.0 minutes. The following compositions were evaluated for slump and handling characteristics:

| Additive to Liquid Mixture I | Slump (ASTM C-143) | | Handling Characteristics of Slurry |
|---|---|---|---|
|  | (Inches) | (cm.) |  |
| None (control) | ¼ | 0.6 | Stiff |
| Mineral Spirits, 0.10 part | ¼ | 0.6 | Stiff |
| Calcium Resinate A, 0.12 part Dissolved in Mineral Spirits, 0.10 part | 1¼ | 3.8 | Workable |

Thus, the workability of the slurry was improved by the addition of calcium resinate to liquid mixture I.

Example 6

This Example illustrates the combined use of $CaCO_3$ surface treated with calcium resinate plus a solution of the calcium resinate used in Example 5 to improve the workability of methacrylate polymer concrete mix when only 7.0 parts of methacrylate liquid mixture was used. Powder mixture III and liquid mixture I from Example 1, containing the additives listed in the table below, at a ratio of 93.0 parts to 7.0 parts, respectively, were mixed in a concrete mixer for 2.0 minutes. The following compositions were evaluated:

| Additive to Liquid Mixture I | Slump (ASTM C-143) | | Handling Characteristics of Slurry |
|---|---|---|---|
|  | (Inches) | (cm.) |  |
| None (control) | ½ | 1.3 | Very Stiff |
| Mineral Spirits, 0.14 part | ½ | 1.3 | Very Stiff |
| Calcium Resinate A, 0.16 part Dissolved in Mineral Spirits, 0.14 part | 6½ | 16.5 | Quite Fluid |

Thus the workability of the slurry was greatly improved by the combined addition of calcium resinate in the form of an additive to liquid mixture I plus a coating on the $CaCO_3$ in the powder mixture.

Example 7

This Example illustrates the use of calcium resinate solution in which the resinate is the one used in Example 5 to improve the workability of methacrylate polymer concrete when the inorganic fines less than 200 mesh sieve size (75 μm.) are amorphous silica rather than $CaCO_3$. Powder mixture IV was prepared the same as powder mixture I of Example 1, except that the $CaCO_3$ was replaced with an equal amount of amorphous silica fines. The average particle size was less than 75 μm in each case. Liquid mixture II was prepared as follows:

| Ingredient | % By Weight |
|---|---|
| Methyl Methacrylate | 90.2 |
| Paraffinic Oil A | 9.0 |
| Dimethyl-p-Toluidine | 0.8 |

The ingredients were charged to a concrete mixer in the following order:

|  | Parts |
|---|---|
| No. 3 Sandblast Sand | 13.8 |
| Powder Mixture IV | 65.1 |
| Liquid Mixture II | 7.4 |
| No. 3 Sandblast Sand | 13.7 |

The mixing time was 2.0 minutes. In the compositions in the table below, the additives listed were added to liquid mixture II.

| Additive to Liquid Mixture II | Slump (ASTM C-143) | | Handling Characteristics of Slurry |
|---|---|---|---|
|  | (Inches) | (cm.) |  |
| None (control) | ¼ | 0.6 | Stiff |
| Mineral Spirits, 0.19 part | ¼ | 0.6 | Stiff |
| Calcium Resinate A, 0.22 part Dissolved in Mineral Spirits, 0.19 part | 5½ | 14.0 | Very Fluid |

Example 8

This example illustrates the use of zinc resinate powder A which was predissolved in methyl methacrylate monomer (1:1 by weight), for convenience. The acid number of zinc resinate A equaled 5, which indicated nearly complete neutralization. Powder mixture IV and liquid mixture II from Example 7 were used. Only 6.1 parts of liquid mixture II were used.

The ingredients were charged to the concrete mixer in the following order:

|  | Parts |
| --- | --- |
| No. 3 Sandblast Sand | 13.75 |
| Powder Mixture IV | 66.40 |
| Liquid Mixture II | 6.10 |
| No. 3 Sandblast Sand | 13.75 |

The mixing time was 2.0 minutes. In the compositions in the table below, the additives listed were added to liquid mixture II.

| Additive to Liquid Mixture II | Slump (ASTM C-143) | | Handling Characteristics of Slurry |
| --- | --- | --- | --- |
|  | (Inches) | (cm.) |  |
| None (control) | 0 | 0 | Extremely stiff |
| Methyl Methacrylate, 0.60 part | ¼ | 0.64 | Very stiff |
| Zinc Resinate A, 0.60 part Dissolved in Methyl Methacrylate, 0.60 part | 2 | 5.1 | Workable |

Thus the workability of the slurry at 6.7 parts of total liquids was significantly improved by the addition of zinc resinate.

Example 9

This example illustrates the use of a blend B of alkaline earth resinate in a solution which contains 60% resinate dissolved in lactol spirits (a predominantly aliphatic hydrocarbon solvent which contains 10% toluene). The solution was analyzed to contain the following metals: 1.70% calcium, 1.64% zinc, and 0.23% magnesium. The solution had an acid number of 45. Powder mixture IV and liquid mixture II of Example 7 were used. Also, one part of Kaolin A was preblended with each 100 parts of powder mixture IV. Kaolin, which is commonly called clay, is a hydrous aluminosilicate. Kaolin A had a median particle size of 0.20 μm.

The ingredients were charged to a concrete mixer in the following order:

|  | parts |
| --- | --- |
| No. 3 Sandblast Sand | 13.50 |
| Powder Mixture IV | 64.25 |
| Kaolin A | 0.64 |
| Liquid Mixture II | 7.90 |
| No. 3 Sandblast Sand | 13.50 |

The mixing time was 2.0 minutes. In the compositions listed below, the additives listed were added to liquid mixture II.

| Additive to Liquid Mixture II | Slump (ASTM C-143) | | Handling Characteristics of Slurry |
| --- | --- | --- | --- |
|  | (Inches) | (cm.) |  |
| None (control) | ¼ | 0.6 | stiff |
| Lactol Spirits, 0.08 part | ¼ | 0.6 | Stiff |
| Ca/Zn/Mg Resinate B, 0.12 part Dissolved in Lactol Spirits, 0.08 part | 1.5 | 3.8 | Workable |

I claim:

1. An improved methacrylate polymer concrete slurry consisting essentially of
    (a) particulate inorganic filler containing silica
    (b) a methacrylate polymerization initiator
    (c) a plasticizer for methacrylate polymer
    (d) methacrylate polymer
    (e) methacrylate monomer
    (f) paraffinic oil, and
    (g) a methacrylate polymerization promotor,
in which the improvement comprises the presence in the slurry of 0.03 to 0.60% by weight of slurry of an alkaline earth metal resinate.

2. The concrete slurry of claim 1 wherein:
    component (a) is silica and/or calcium carbonate,
    component (b) is benzoyl peroxide
    component (c) is an alkyl aryl phosphate
    component (d) is polymethyl methacrylate polymer
    component (e) is methyl methacrylate monomer,
    component (f) is paraffinic oil
    component (g) is an aromatic tertiary amine, and
    the resinate is calcium resinate or zinc resinate.

3. An improved powder mixture for use in making a methacrylate polymer concrete slurry consisting essentially of
    (a) particulate inorganic filler containing silica, and/or calcium carbonate,
    (b) a methacrylate polymerization initiator,
    (c) a plasticizer for methacrylate polymer, and
    (d) methacrylate polymer in particulate form,
in which the improvement comprises the presence in the powder mixture of 0.05 to 0.30% by weight of alkaline earth metal resinate.

4. An improved liquid mixture for use in making a methacrylate polymer concrete consisting essentially of
    (a) methacrylate monomer
    (b) paraffinic oil, and
    (c) a polymerization promotor,
in which the improvement comprises the presence in the liquid mixture of 0.5 to 9.0% by weight of alkaline earth metal resinate.

5. The improved powder mixture of claim 3 wherein component (a) contains calcium carbonate, and the resinate is coated on the calcium carbonate.

* * * * *